Oct. 17, 1967

F. C. BOLICK, JR 3,347,432

ENDLESS TAPE CONTROL DEVICE

Filed July 18, 1966

2 Sheets-Sheet 1

INVENTOR.
FRED C. BOLICK
BY Newton, Hopkins, Jones & Ormsby
ATTORNEYS

Oct. 17, 1967

F. C. BOLICK, JR 3,347,432

ENDLESS TAPE CONTROL DEVICE

Filed July 18, 1966

2 Sheets-Sheet 2

INVENTOR.

FRED C. BOLICK

BY Newton, Hopkins, Jones & Ormsby

ATTORNEYS 3,347,432
ENDLESS TAPE CONTROL DEVICE

Fred C. Bolick, Jr., Atlanta, Ga., assignor to Lanier Electronics Laboratory, Inc., Atlanta, Ga., a corporation of Georgia Filed July 18, 1966, Ser. No. 565,941
10 Claims. (Cl. 226—50)

ABSTRACT OF THE DISCLOSURE

What is disclosed herein is a tape control device for controlling the motion of an endless tape in two directions along both a first path and a second path through a recording-reproducing zone which is between a first tape magazine and a second tape magazine and in which the first path traverses the second path. The tape control device includes a first tape driving means for moving the tape through the recording-reproducing zone in the first path toward the first tape magazine and in the second path toward the second tape magazine, and a second tape driving means spaced from the first tape driving means for moving the tape through the recording-reproducing zone in the first path toward the second tape magazine and in the second path toward the first tape magazine.

This invention relates to tape control devices and more particularly to a tape control device for recording-reproducing equipment in which an endless magnetic tape is used in the recording, storing and transcribing of information.

In recording-reproducing equipment in which an endless tape is used in the recording, storing, and transcribing of information, it is customary to store the tape subsequent to the recording of information on the tape and prior to the transcribing of information from the tape in a recorded tape magazine and to store the tape subsequent to the transcribing of information and prior to the recording of information in a separate transcribed tape magazine. The function of recording information on the tape is accomplished by transferring the tape with a recording motion from the transcribed tape magazine to the recorded tape magazine through a recording-reproducing zone in which the recording of information occurs. Similarly, the function of transcribing information from the tape is accomplished by transferring the tape with a transcribing motion from the recorded tape magazine to the transcribed tape magazine through the recording-reproducing zone in which the transcribing of information also occurs.

Thus, an essential device in recording-reproducing equipment of this type is a tape control device to provide for both a recording motion and a transcribing motion of the tape between tape magazines through the recording-reproducing zone. Moreover, in addition to providing these two tape motions, a tape control device must provide for two opposite motions of the tape. One of these opposite motions of the tape is a recording review motion which is opposite to the recording motion of the tape so as to provide for review of previously recorded information during subsequent recording motion of the tape. The other of these opposite motions is a transcribing review motion which is opposite to the transcribing motion of the tape so as to provide for review of previously transcribed information during subsequent transcribing motion of the tape.

The most convenient arrangement for a transcribed tape magazine and a recorded tape magazine is a side by side arrangement and this arrangement of these tape magazines and the requirement that a tape control device provided four tape motions have resulted in a variety of tape control devices being used in the prior art. These prior art tape control devices have generally used a single tape driving means to provide both recording motion and recording review motion of the tape and a single tape driving means to provide both transcribing motion and transcribing review motion of the tape.

A difficulty with such prior tape control devices is that both recording motion and recording review motion of the tape must be at the same speed unless a relatively complicated and expensive to maintain and manufacture variable speed mechanism is included in the tape driving means used to provide both of these motions. A further difficulty with these prior tape control devices is that the providing of recording motion with one tape driving means and of transcribing motion with another tape driving means requires careful coordination of one tape driving means with the other tape driving means in order to insure that the recording motion and the transcribing motion of the tape are at substantially the same speed so as to avoid the distortion of information on the tape during transcribing. This requirement for coordination serves further to increase the maintenance and manufacturing expense characteristic of prior art tape control devices.

The invention disclosed herein overcomes these and other difficulties encountered with prior art tape control devices in that it provides a tape control device for transferring tape between a recorded tape magazine and a transcribed tape magazine through a recording-reproducing zone with a single tape driving means being used for both recording motion and transcribing motion of the tape and with a second tape driving means being used for both recording review motion and transcribing review motion of the tape. The use of a single tape driving means to provide both recording motion and transcribing motion of the tape insures that both of these motions of the tape are always at the same speed so that there can be no distortion of recorded information on the tape during transcribing while at the same time avoiding any requirement for careful coordination of one tape driving means with another tape driving means.

The use of a second tape driving means to provide both recording review motion and transcribing review motion insures that both of these motions are independent of recording motion and transcribing motion and are at that speed which is most efficient without the use of a relatively expensive to maintain and manufacture variable speed mechanism. Moreover, a tape control device embodying the invention disclosed herein is relatively simple in construction and is for this reason also relatively inexpensive to maintain and manufacture.

These improvements in a tape control device are provided by a tape control device having a first tape driving means positioned adjacent a recording-reproducing zone for transferring tape between a recorded tape magazine and a transcribed tape magazine, and a second tape driving means positioned at the opposite end of the recording-reproducing zone for transferring tape between the recorded tape magazine and the transcribed tape magazine. The first tape driving means provides both recording motion and transcribing motion of the tape and the second tape driving means provides both recording review motion and transcribing review motion of the tape and the tape extends through the recording-reproducing zone in a first path and in a second path which traverses the first path.

The tape moves in the first path for both recording motion and recording review motion and moves in the second path for both transcribing motion and transcribing review motion and in order to insure that tape motion in the first path does not interfere with tape motion in the second path, the invention provides a displacing means for displacing the tape in the first path from the tape in the second path. The displacing means also serves to maintain the tape in each path in proper alignment with both the first tape driving means and the second tape driving means so as to improve the reliability of the tape control device.

These and other features and advantages of the invention will be more clearly understood from the following detailed description and the accompanying drawings in which like characters of reference designate corresponding parts throughout and in which.

Figure 1:
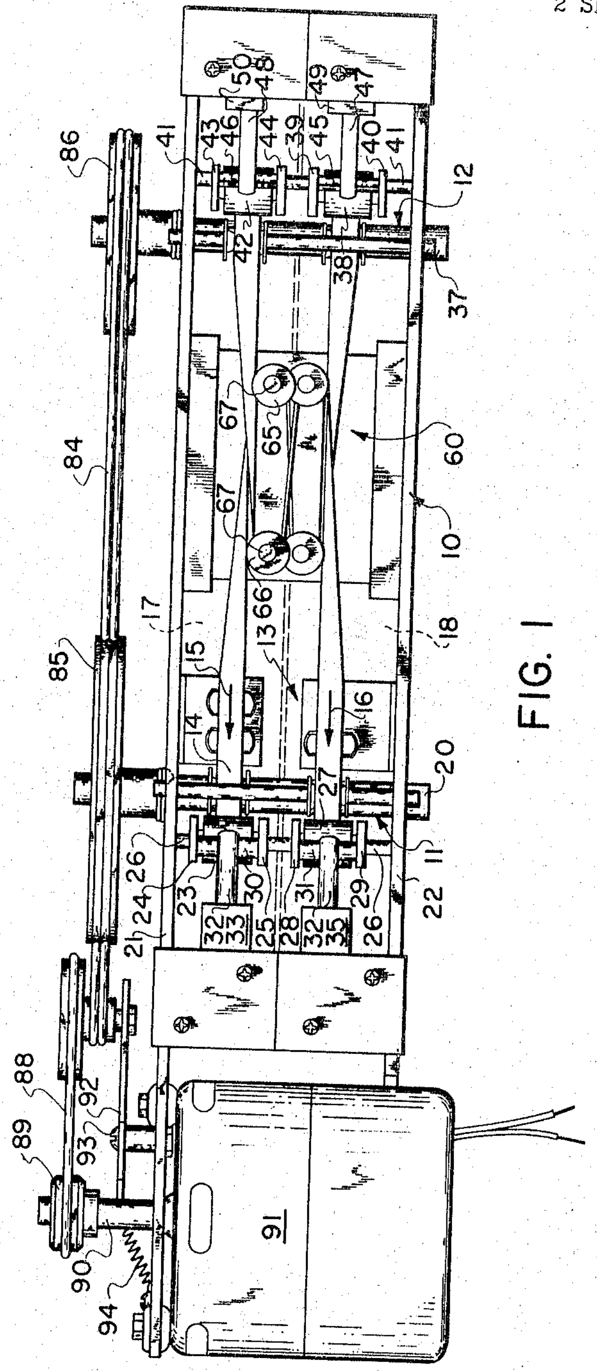
FIG. 1 is a top plan view of an embodiment of the invention.

These figures and the following detailed description disclose a specific embodiment of the invention but the invention is not limited to the details disclosed since they may be embodied in other equivalent forms.

The invention disclosed herein may be most easily understood as a tape control device 10 comprising a first tape driving means 11 and a second tape driving means 12 positioned at opposite ends of a recording-reproducing zone 13. A tape 14 extends between the first tape driving means 11 and the second tape driving means 12 through the recording-reproducing zone 13 in a first path 15 and in a second path 16 which traverses the first path 15. The first tape driving means 11 provides recording motion to the tape 14 in the first path 15 and transcribing motion to the tape 14 in the second path 16. Similarly, the second driving means 12 provides recording review motion to tape 14 in the first path 15 and transcribing review motion to the tape 14 in the second path 16.

It will be understood that when a recorded tape magazine 17 and a transcribed tape magazine 18 are arranged side by side as shown in FIG. 1, the traversing of the first path 15 by the second path 16 results in the tape 14 being transferred back and forth between the recorded tape magazine 17 and the transcribed tape magazine 18 by the four motions of the tape 14 in substantially conventional manner. It is because of this that the tape magazines 17 and 18 are only generally shown. It is also because of this and because the operation of the tape control device 10 will be understood by those skilled in the art once the invention is understood that the tape control device 10 is shown alone without control circuits and other components customarily used in recording-reproducing equipment.

Figure 2:
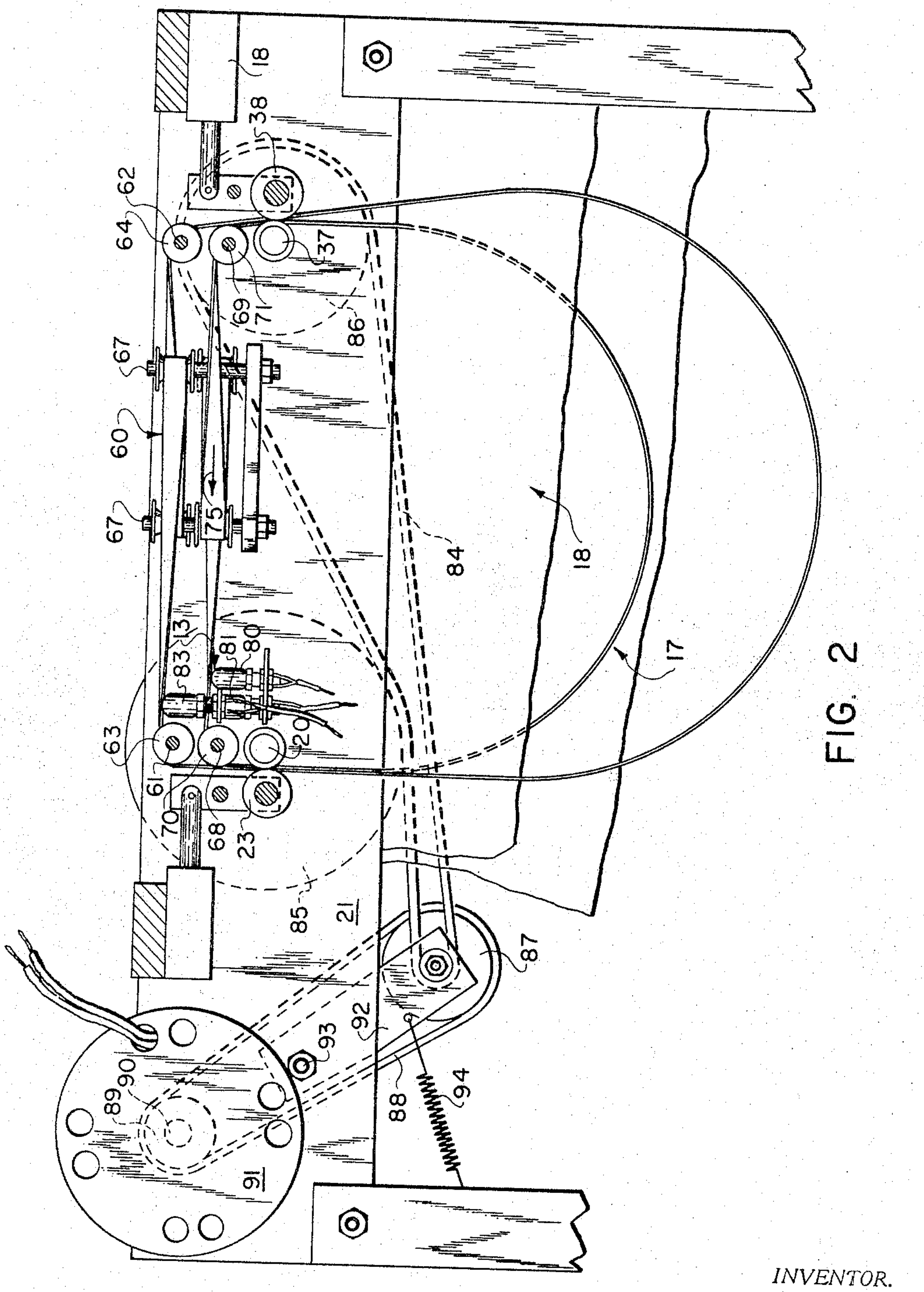
FIG. 2 is a side elevational view of that embodiment of that invention shown in FIG. 1 with a side member cut away to more clearly show the invention.

In that embodiment of the invention shown in FIGS. 1 and 2, the first tape driving means 11 includes a rotating shaft 20 extending between a side member 21 and a side member 22 and a recording idler roller 23 rotatably mounted between plates 24 and 25 which are in turn pivotally mounted on a rod 26 extending between the side members 21 and 22 above the recording idler roller 23. The rod 26 is parallel to the shaft 20 and serves to position the recording idler roller 23 adjacent the shaft 20. The first tape driving means 11 also includes a transcribing idler roller 27 rotatably mounted between plates 28 and 29 which are pivotably mounted on the rod 26 adjacent the plates 24 and 25 so as to position the transcribing idler roller 27 adjacent the shaft 20 and laterally of the recording idler roller 23.

A yoke 30 is pivotably mounted between the plates 24 and 25 above the rod 26 and a yoke 31 is pivotably mounted between the plates 28 and 29 above the rod 26. The plunger 32 of a solenoid-plunger unit 33 is operably connected to the yoke 30 and the plunger 34 of a solenoid-plunger unit 35 is operably connected to the yoke 31 and it will be understood that the energizing of the solenoid-plunger unit 33 results in the recording idler roller 23 pivoting toward the shaft 20 and that the energizing of the solenoid-plunger unit 35 results in the transcribing idler roller 27 pivoting toward the shaft 20. Thus, when the tape 14 in the first path 15 is positioned between the shaft 20 and the recording idler roller 23 and the tape 14 in the second path 16 is positioned between the shaft 20 and the transcribing idler roller 27, the energizing of either or both the solenoid-plunger unit 33 or the solenoid-plunger unit 35 causes motion of the tape 14 in a direction determined by the rotation of the shaft 20.

Similar to the first tape driving means, the second tape driving means 12 includes a rotating shaft 37 which extends between the side member 21 and the side member 22 and a recording review idler roller 38 rotatably mounted between plates 39 and 40 which are in turn pivotably mounted on a rod 41 extending between the side member 21 and the side member 22 above the recording review idler roller 38. The rod 41 is parallel to the shaft 37 and serves to position the recording review idler roller 38 adjacent the shaft 37. The second tape driving means 12 also includes a transcribing review idler roller 42 rotatably mounted between plates 43 and 44 which are pivotably mounted on the rod 41 adjacent the plates 39 and 40 so as to position the transcribing review idler roller 42 adjacent the shaft 37 and laterally of the recording review idler roller 38.

Yokes 45 and 46 are pivotably mounted between plates 39 and 40 and the plates 43 and 44 respectively and are operatively connected to the plungers 47 and 48 of solenoid-plunger units 49 and 50, respectively. Thus, it will now be understood that as with the first tape driving means 11, the second tape driving means 12 is operative in response to the energizing of the solenoid-plunger units 49 and 50 to provide motion of the tape 14 in the first path 15 and in the second path 16.

The shaft 20 and the shaft 37 are substantially parallel to each other and the tape 14 passes through the recording-reproducing zone 13 as it moves in the first path 15 and in the second path 16 between the first tape driving means 11 and the second tape driving means 12. In addition, the recording idler roller 23 is positioned above the recorded tape magazine 17 and the recording review idler roller 38 is positioned above the transcribed tape magazine 18. Similarly, the transcribing idler roller 27 is positioned above the transcribed tape magazine 18 and the transcribing review idler roller 42 is positioned above the recorded tape magazine 17. It is this arrangement of the idler rollers 23, 27, 38 and 42 and the traversing of the first path 15 by the second path 16 which result in the tape 14 being transferred between the tape magazines 17 and 18 in substantially conventional manner.

In order to prevent entanglement of the tape 14 as the second path 16 traverses the first path 15, that embodiment of the invention disclosed herein includes a displacing means 60 which serves to vertically displace the tape 14 in the second path 16 relative to the tape 14 in the first path 15. In the tape control device 10, the displacing means 60 includes a first upper horizontal shaft 61 positioned above the shaft 20 and a second upper horizontal shaft 62 positioned above the shaft 37. Flanged wheels 63 and 64 are mounted on the upper horizontal shafts 61 and 62 respectively and the displacing means 60 also includes a first upper spool 65 and a second upper spool 66, each rotatable about a vertical pin 67 extending from a platform 59.

It will be understood from FIGS. 1 and 2 that the wheels 63 and 64 and the upper spools 65 and 66 are arranged so that the second path 16 of the tape 14 through the recording-reproducing zone 13 extends from the first tape driving means 11 upwardly and over the first upper horizontal shaft 61, thence to and around the upper spool 65, thence to and around the upper spool 66, and thence to and downwardly over the second upper horizontal shaft 62 to the second tape driving means 12. Thus, the positioning of the upper horizontal shafts 61 and 62 determines the vertical position of the second path 16 between the first tape driving means 11 and the second tape driving means 12 and the positioning of upper spools 65 and 66 serves to provide for the lateral displacement of the tape 14 as the tape 14 passes from the first tape driving means 11 to the second tape driving means 12 in the second path 16.

The displacing means 60 also includes lower horizontal shafts 68 and 69 and the lower spools 70 and 71 which serve to define the first path 75 of the tape 14 through the recording-reproducing zone 13 in a manner which causes the tape 14 to pass in the first path 15 below the second path 16 as the second path 16 traverses the first path 15. Similar to the upper spools 65 and 66, the lower spools 70 and 71 serve to provide for the lateral displacement of the tape 14 as the tape 14 passes from the first tape driving means 11 to the second tape driving means 12. The lower horizontal shafts 68 and 69 serve to determine the vertical position of the first path 15 relative to the second path 16.

It will now be understood that the tape control device 10 provides a first path 15 and a second path 16 through the recording-reproducing zone 13. More importantly, it will be understood that when the shaft 20 is rotated in a counter-clockwise direction and the shaft 37 is rotated in a clockwise direction as seen in FIG. 2, the energizing of the solenoid-plunger unit 33 causes the recording idler roller 23 to force the tape 14 against the shaft 20 which in turn causes recording motion of the tape 14 in the first path 15 toward the left as viewed in FIG. 1 through the recording-reproducing zone 13. Similarly, the energizing of the solenoid-plunger unit 35 causes the transcribing idler roller 27 to force the tape 14 against the shaft 20 which in turn causes transcribing motion of the tape 14 in the second path 16 toward the left as viewed in FIG. 1 through the recording-reproducing zone 13.

The energizing of the solenoid-plunger units 49 and 50 cause a similar motion of the recording review idler roller 38 and the transcribing review idler roller 42, respectively, to provide for recording review motion of the tape 14 to the right through the recording-reproducing zone 13 in the first path 15 and for a transcribing review motion of the tape 14 to the right through the recording-reproducing zone 13 in the second path 16. The energizing of the solenoid-plunger units 33, 35, 49 and 50 may be by any conventional circuit arrangement which provides for their selective energizing in accordance with whether recording motion, transcribing motion, recording review motion, or transcribing review motion of the tape 14 is required.

It will be understood that with these four motions of tape 14 through a recording-reproducing zone 13, an erasing head 80 and a recording head 81 may be arranged to operatively engage the tape 14 in the recording-reproducing zone 13 as the tape 14 moves in the first path 15 between the first tape driving means and the second tape driving means 12. Similarly, a transcribing head 83 may be arranged to operatively engage the tape 14 as it moves in the second path 16 between the first tape driving means 11 and the second tape driving means 12.

It will also be understood that any conventional means may be used to rotate the shaft 20 in a counter-clockwise direction and the shaft 37 in a clockwise direction as seen in FIG. 2. Thus, in that embodiment of the invention disclosed herein, the shaft 20 and the shaft 37 are both driven by a belt 84 which engages a pulley 85 mounted on the outer end of the shaft 20 and a pulley 86 mounted on the outer end of the shaft 37. The belt 84 extends from the smaller of the pair of speed changing pulleys 87 which are in turn driven by a belt 88 from a pulley 89 mounted on the shaft 90 of a motor 91 positioned between the side members 21 and 22.

Tension is maintained in the belt 85 by mounting the pair of speed changing pulleys 87 on an arm 92 pivotably attached to the side member 21 by a bolt 93 and by using a spring 94 to urge the arm 92 in that direction which maintains tension in the belt 85. However, regardless of the particular arrangement used to rotate the shafts 20 and 37, the invention provides for the rotational speed of the shaft 20 to be substantially different from the rotational speed of the shaft 37.

In that embodiment of the invention disclosed herein, substantially different rotational speeds for the shafts 20 and 37 are achieved by providing the pulley 86 with a radius substantially greater than the radius of the pulley 85. However, regardless of the manner in which the substantially different rotational speeds of the shafts 20 and 37 are provided, the invention conveniently provides recording review motion and transcribing review motion of the tape 14 which is at a substantially greater rate than recording motion or transcribing motion of the tape 14. Moreover, they are provided in a manner which does not require the relatively complicated variable speed mechanism which has been characteristic of the prior art tape control devices.

In addition, regardless of the manner in which the rotation of the shaft 20 and the rotation of the shaft 37 are provided, both recording motion and transcribing motion of the tape 14 must be at the same speed. Thus, the invention provides for that recording motion and transcribing motion of a tape 14 required to avoid distortion of the information on the tape 14 during transcribing without the necessity for carefully coordinating the speed with one tape driving means 11 with another tape driving means 12 as in the prior art. Furthermore, it will be understood from the foregoing description of an embodiment of the invention disclosed herein, that the invention may be embodied in a tape driving device 10 which is relatively simple in construction and therefore relatively inexpensive to maintain and manufacture.

It will be obvious to those skilled in the art that many variations may be made in the embodiments chosen for the purpose of illustrating the present invention without departing from the scope thereof as defined by the appended claims.

What is claimed as invention is:

1. In a tape control device for controlling the motion of an endless tape in a recording-reproducing zone through which said tape is moved between a first tape magazine and a second tape magazine positioned side by side adjacent said zone, first tape driving means for moving said tape through said zone toward said first tape magazine along a first path and for separately and independently moving said tape through said zone toward said second tape magazine along a second path which traverses said first path within said zone, and second tape driving means spaced from said first tape driving means for moving said tape through said zone toward said second tape magazine along said first path and for separately and independently moving said tape through said zone toward said first tape magazine along said second path, both said first path and said second path being between said first tape driving means and said second tape driving means within said zone.

2. The tape control device of claim 1 including displacing means for vertically displacing said tape as it moves in said first path from said tape as it moves in said second path.

3. The tape control device of claim 2 wherein said displacing means guides said tape as said second path traverses said first path.

4. The tape control device of claim 2 wherein said displacing means laterally displaces said tape relative to said second path as said tape moves in said first path.

5. The tape control device of claim 1 wherein said first tape driving means includes a first rotating shaft, means for selectively bringing said tape into engagement with a first length of said first rotating shaft, and means for selectively bringing said tape into engagement with a second length of said first rotating shaft which is displaced from said first length of said first rotating shaft.

6. The tape control device of claim 5 wherein said second tape driving means includes a second rotating shaft having a rotational speed greater than said first rotating shaft, means for selectively bringing said tape into engagement with a first length of said second rotating shaft, and means for selectively bringing said tape into engagement with a second length of said second rotating shaft which is displaced from said first length of said second rotating shaft.

7. The tape control device of claim 1 in which said first tape driving means includes a first rotating shaft positioned to engage tape in both said first path and said second path, and said second tape driving means includes a second rotating shaft positioned to engage tape in both said first path and said second path.

8. The tape control device of claim 1 in which said first tape driving means and said second tape driving means are constructed and arranged to position said first path substantially parallel to said second path adjacent to both said first tape driving means and said second tape driving means.

9. The tape control device of claim 1 in which said first tape driving means and said second tape driving means are both positioned above both said first tape magazine and said second tape magazine so that tape in said first path extends through said zone from said first tape driving means and above said first tape magazine to said second tape driving means and above said second tape magazine and so that tape in said second path extends through said zone from said first tape driving means and above said second tape magazine to said second tape driving means and above said first tape magazine.

10. In a tape control device for controlling the motion of a tape; first tape driving means having a first rotating shaft, means for selectively bringing tape positioned in a first path into engagement with a first length of said first rotating shaft, and means for selectively bringing tape positioned in a second path separate from said first path into engagement with a second length of said first rotating shaft; and second tape driving means having a second rotating shaft, means for selectively bringing tape positioned in said first path into engagement with a first length of said second rotating shaft, and means for selectively bringing tape positioned in said second path into engagement with a second length of said second rotating shaft; said first length and said second length of said first rotating shaft and said first length and said second length of said second rotating shaft being positioned relative to each other so that tape positioned in said first path must traverse tape positioned in said second path between said first tape driving means and said second tape driving means.

References Cited

UNITED STATES PATENTS 3,122,294 2/1964 Laa ---------------- 226—50

M. HENSON WOOD, Jr., *Primary Examiner.*

R. A. SCHACHER, *Assistant Examiner.*